(12) United States Patent
Spurling et al.

(10) Patent No.: US 11,186,316 B2
(45) Date of Patent: Nov. 30, 2021

(54) SYSTEMS FOR A DEFLECTOR WEDGE

(71) Applicant: Ford Global Technologies, LLC, Dearborn, MI (US)

(72) Inventors: Michael Spurling, Romford (GB); Luis Pinheiro, Maia (PT); Scott Martin, Canvey Island (GB)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 16/403,319

(22) Filed: May 3, 2019

(65) Prior Publication Data

US 2019/0337568 A1 Nov. 7, 2019

(30) Foreign Application Priority Data

May 4, 2018 (GB) ...................................... 1807349

(51) Int. Cl.
| | | |
|---|---|---|
| *B62D 21/15* | (2006.01) | |
| *B62D 25/08* | (2006.01) | |
| *B60H 1/00* | (2006.01) | |
| *B60K 13/02* | (2006.01) | |
| *B60K 15/01* | (2006.01) | |

(52) U.S. Cl.
CPC ....... *B62D 21/152* (2013.01); *B60H 1/00507* (2013.01); *B60K 13/02* (2013.01); *B60K 15/013* (2013.01); *B62D 25/082* (2013.01)

(58) Field of Classification Search
CPC ................ B62D 21/152; B62D 25/082; B60H 1/00507; B60K 13/02; B60K 15/013; B60K 2015/03243; B60K 15/01; B60K 15/04; B60Y 2306/01; B60R 21/00; B60R 2021/0004; F02M 35/10; F02M 35/16

USPC .................................................... 296/187.09
See application file for complete search history.

(56) References Cited

U.S. PATENT DOCUMENTS

| | | | | |
|---|---|---|---|---|
| 6,739,634 B1 * | 5/2004 | Pagan | ..................... | B60R 19/44 |
| | | | | 293/117 |
| 2003/0230443 A1 * | 12/2003 | Cramer | ..................... | B60G 3/20 |
| | | | | 180/65.51 |
| 2004/0149267 A1 | 8/2004 | Takahashi et al. | | |
| 2007/0102222 A1 | 5/2007 | Tanaka | | |
| 2014/0352642 A1 | 12/2014 | Kilby et al. | | |
| 2015/0101696 A1 | 4/2015 | Ishiki et al. | | |

(Continued)

FOREIGN PATENT DOCUMENTS

| | | | |
|---|---|---|---|
| DE | 202004019821 U1 | 4/2006 | |
| EP | 1632675 A1 | 3/2006 | |

(Continued)

OTHER PUBLICATIONS

Great Britain Intellectual Property Office, Combined Search and Examination Report under Section 17 and 18(3) Issued in Application No. GB1807349.4, dated Nov. 2, 2018, 8 pages.

*Primary Examiner* — Pinel E Romain
(74) *Attorney, Agent, or Firm* — Geoffrey Brumbaugh; McCoy Russell LLP

(57) ABSTRACT

Methods and systems are provided for a deflector. In one example, a system includes a first engine bay component comprising a deflector with a deflection surface shaped to engage a second engine bay component to rotate the first engine bay component and mitigate contact between the first engine bay component and a third engine bay component.

20 Claims, 3 Drawing Sheets

(56) References Cited

U.S. PATENT DOCUMENTS

| | | |
|---|---|---|
| 2016/0040822 A1 | 2/2016 | Cetnar et al. |
| 2016/0341159 A1 | 11/2016 | Dominic |

FOREIGN PATENT DOCUMENTS

| | | |
|---|---|---|
| EP | 2439111 A1 | 4/2012 |
| FR | 3050156 A1 | 10/2017 |
| JP | 2006224874 A | 8/2006 |
| JP | 2007084041 A | 4/2007 |
| JP | 2014008940 A | 1/2014 |

* cited by examiner

SYSTEMS FOR A DEFLECTOR WEDGE

CROSS REFERENCE TO RELATED APPLICATION

The present application claims priority to United Kingdom patent application No. 1807349.4, filed on May 4, 2018. The entire contents of the above-listed application are hereby incorporated by reference for all purposes.

FIELD

The present description relates generally to a deflector wedge of an engine intake air duct.

BACKGROUND/SUMMARY

During a vehicle collision, the components inside a vehicle engine, such as an air intake duct and a fuel line may be displaced towards one another through impact derived deformation of the vehicle. The body structure of some vehicles, particularly vehicles with compact engines, may provide limited space to accommodate the impact derived movement of the air intake duct, fuel lines, and fuel connecters due to tight space constraints. The impact derived movement can sometimes lead to trapping of flexible fuel lines between sharp edges of other components, which may result in degradation, including fuel leaking from the fuel line due to a leak.

In one example, the issues described above may be addressed by a system for a first engine bay component arranged between a second engine bay component and a third engine bay component, wherein the first engine bay component comprises a wedge protruding toward the second engine bay component shaped to rotate the first engine bay component when an angled deflection face of the wedge contacts the second engine bay component. In this way, the first engine bay component may be controllably displaced during a vehicle collision to mitigate contact between the first engine bay component and the third engine bay component.

As one example, the vehicle collision may apply a force substantially along a horizontal plane along which the first, second, and third engine bay components are arranged. The force may result in a displacement of one or more of the first, second, and third engine bay components. In one example, the first and third engine bay components are displaced toward the second engine bay component, wherein the wedge contacts the second engine bay component and is shaped to rotate the first engine bay component due to a force of a contact between the wedge and the second engine bay component. The resulting rotation may rotate the first engine bay component such that the third engine bay component may be displaced toward the first engine bay component without contact the first engine bay component. As such, the third engine bay component may occupy a space previously occupied by the first engine bay component following the vehicle collision.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1A-5 are shown to scale, however, other relative dimensions may be used without departing from the scope of the present disclosure.

DETAILED DESCRIPTION

Figure 1A:
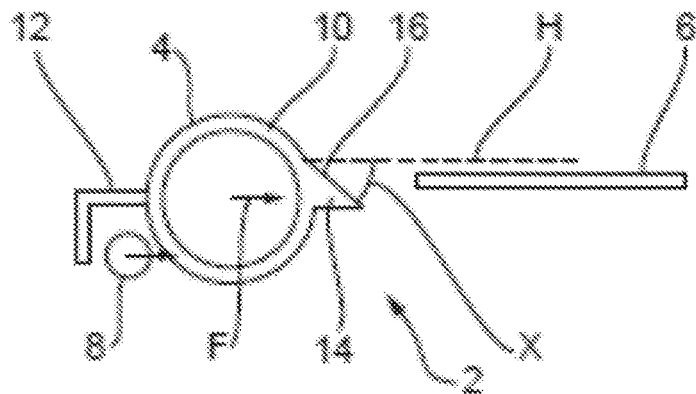
FIG. 1A is a sectional view of the vehicle assembly prior to a vehicle collision.
Figure 1B:
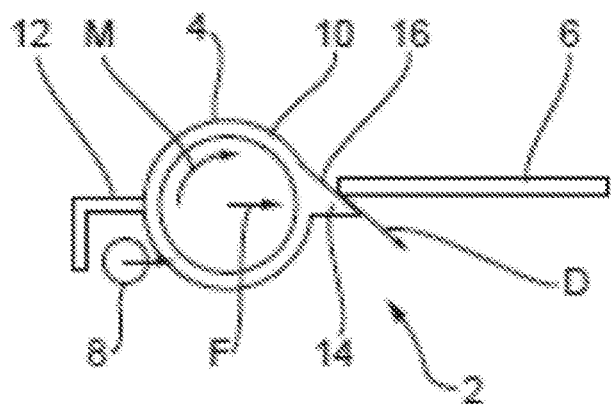
FIG. 1B is a sectional view of the vehicle assembly during the vehicle collision.
Figure 1C:
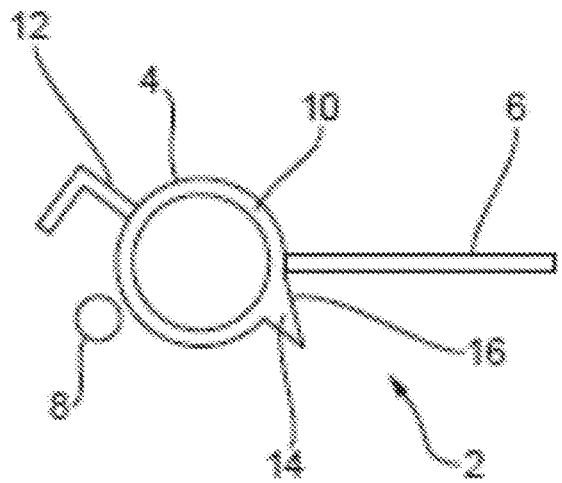
FIG. 1C is a sectional view of the vehicle assembly following the vehicle collision
Figure 2:
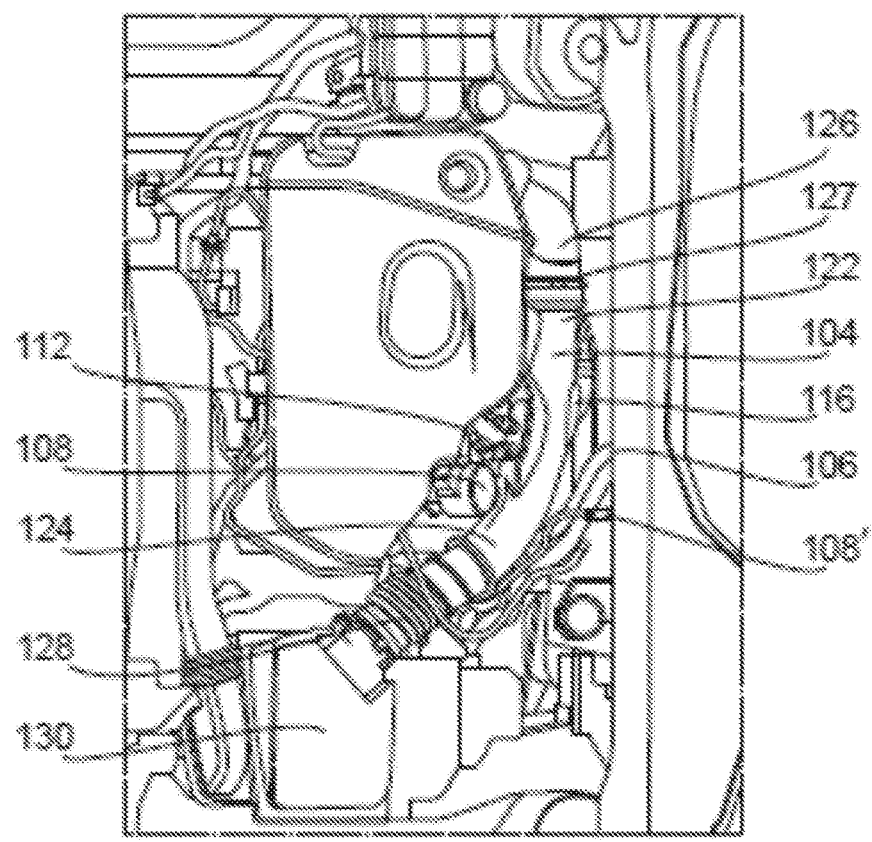
FIGS. 2 and 3 are perspective views of the vehicle assembly prior to the vehicle collision.
Figure 3:
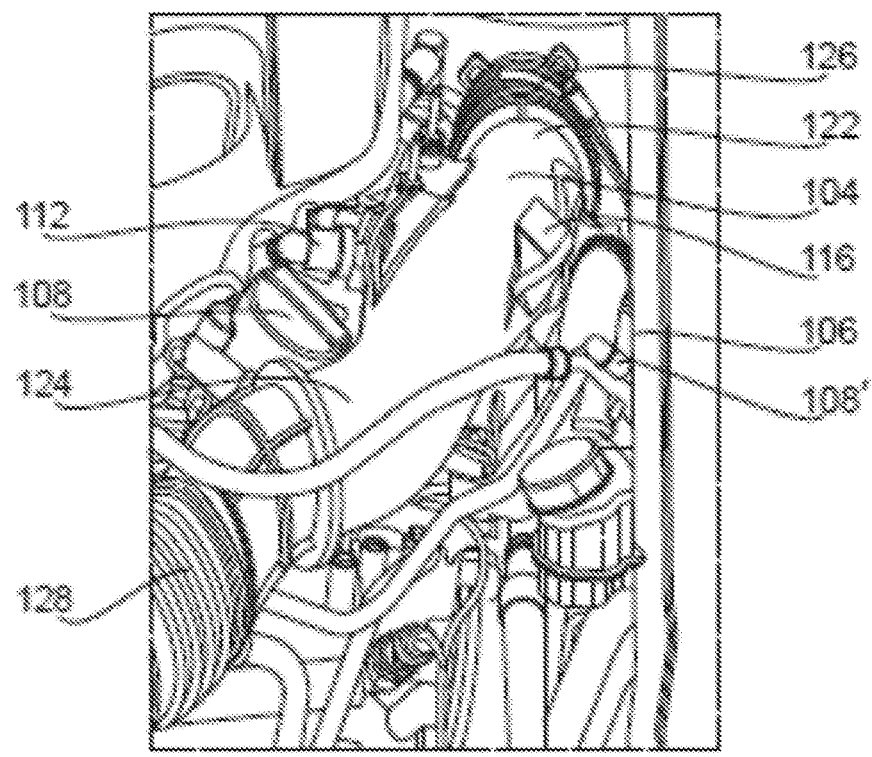
Figure 4:
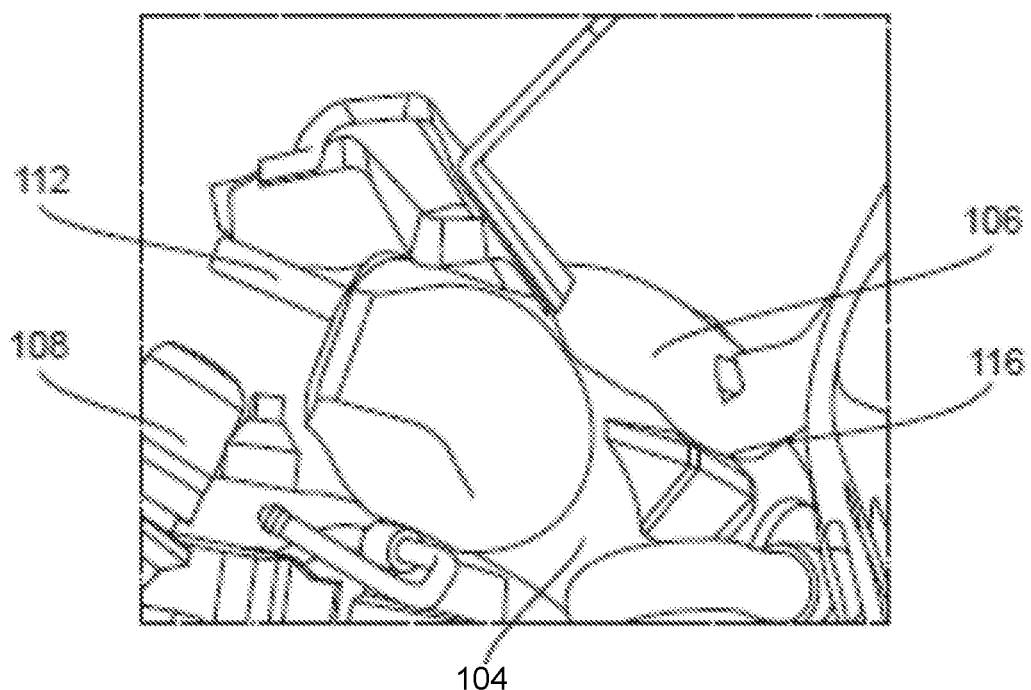
FIGS. 4 and 5 are perspective views of the vehicle assembly following the vehicle collision.
Figure 5:
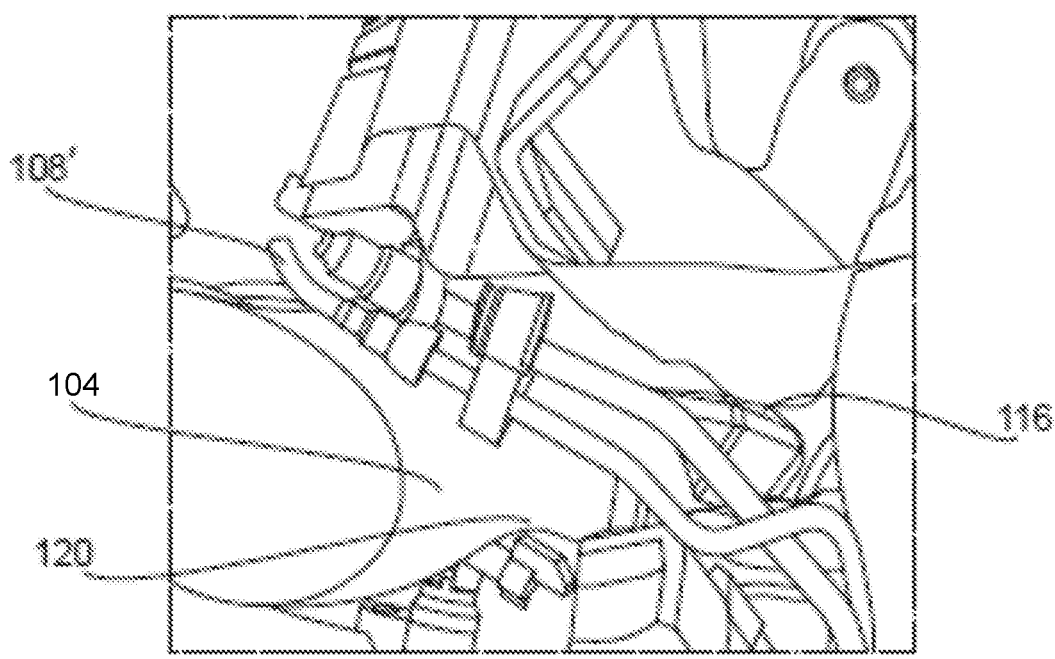

The following description relates to systems and methods for adjusting a position of a first engine bay component arranged between a second engine bay component and a third engine bay component during a vehicle collision. FIG. 1A illustrates a position of the first, second, and third engine bay components previous to a collision. FIG. 1B illustrates a wedge of the first component contacting the second component during the collision. FIG. 1C illustrates a resulting position of the first, second, and third engine bay components due to a force of the vehicle collision and resulting rotation of the first engine bay component. FIGS. 2 and 3 illustrate different perspective views of the first engine bay component and the wedge prior to the collision. FIGS. 4 and 5 illustrate perspective views of a final position of the first and third engine bay components following the vehicle collision.

According to the present disclosure, there is provided a first vehicle engine bay component comprising a crash deflector in the shape of a wedge configured to engage a second vehicle engine bay component during a vehicle impact and cause controlled movement of at least a portion of the first vehicle engine bay component.

The crash deflector may be shaped to cause a controlled movement in a direction non-parallel to a line of action of the impact. That is to say, the controlled movement may be angled to a direction of force (e.g., an impact direction) of the collision.

The controlled movement may comprise a displacement of the first vehicle engine bay component relative to the second vehicle engine bay component.

The movement may comprise a rotation of the first vehicle engine bay component relative to the second vehicle engine bay component. The first vehicle engine bay component may comprise a section of fluid duct, such as engine air intake duct, and the ends of the section of fluid duct may be connected to the remainder of the duct by couplings which enable rotation of the first engine bay component relative to the remainder of the duct. At least one of the couplings may be a flexible coupling. At least one of the couplings may be a slip coupling.

The wedge may be formed by a projecting portion of the first vehicle engine bay component.

The impact may be a frontal impact and the first vehicle engine bay component may be moved at least partially around the second vehicle engine bay component.

The controlled movement of the first vehicle engine bay component may increase the clearance to at least one other component of a vehicle.

The crash deflector may be integrally formed with the first vehicle engine bay component.

The crash deflector may be molded with the first vehicle engine bay component. For example, the crash deflector may be blow molded with the first vehicle engine bay component.

The crash deflector may be fixed to the first vehicle engine bay component. For example, the crash deflector may be attached by releasable fasteners, glued, clipped or welded to the first vehicle engine bay component.

According to another aspect of the present disclosure, there is provided a vehicle assembly comprising a first vehicle engine bay component and a second vehicle engine bay component; wherein the projecting wedge of the first vehicle engine bay component is configured to engage the second vehicle engine bay component during a vehicle impact, so that the first vehicle engine bay component may be deflected in a direction non-parallel to a line of action of the impact (e.g., a direction of the collision) and rotated. In one example, the first vehicle engine bay component is rotated about an axis parallel to the direction of the collision.

The crash deflector may be arranged relative to a third vehicle engine bay component such that an impact at the crash deflector from the second vehicle engine bay component during a collision of the motor vehicle causes a controlled movement of at least a portion of the first vehicle engine bay component in a direction away from the third vehicle engine bay component.

The first vehicle engine bay component may comprise an air intake duct, the second vehicle engine bay component may comprise a heater plenum, and the third vehicle engine bay component may comprise a fuel system component such as a fuel pump.

According to another aspect of the present disclosure, the first, second, and third vehicle engine bay components may be arranged in a vehicle.

The first vehicle engine bay component may comprise more than one crash deflector wedge which may be configured to engage one or more other vehicle components, such as the second and third vehicle engine bay components described above.

FIGS. 1A-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

With reference to FIGS. 1A-5, the vehicle assembly 2 comprises a first vehicle engine bay component 4 which may comprise an engine air intake duct, and a second vehicle engine bay component 6 which may comprise a heater plenum chamber. A third vehicle engine bay component 8, which may comprise a fuel system component such as a fuel pump, a fuel line, or a fuel hose, is in close proximity to the air intake duct 4.

The air intake duct 4 comprises a main body 10, a vacuum hose or breather hose spigot 12 and a crash deflector wedge 14. The crash deflector wedge 14 is provided with a deflection or ramp surface 16.

In the illustrated arrangement, the spigot 12 is shown as a right-angled spigot which extends substantially radially from the main body 10, but other shapes and orientations of spigot 12 are contemplated.

In the illustrated arrangement, the crash deflector wedge 14 projects from the air intake duct 4, opposite to the spigot 12, and comprises a substantially planar top deflection surface 16, and is further bounded by planar bottom and side surfaces which extend substantially radially outwardly from the main body 10. The deflection surface 16 extends substantially tangentially from a circumference of the main body 10, but in other arrangements it may be disposed at a different angle X from a horizontal plane H, with the main body 10 installed in a vehicle and resting on level ground. The angle X is greater than 0 degrees, and may for example be between 30 and 50 degrees. Thus, the angle X is less than 90 degrees relative to the horizontal plane H. In some embodiments, additionally or alternatively, the angle X is less than 70 degrees. In some embodiments, additionally or alternatively, the angle X is between 20 and 60 degrees.

Referring to FIGS. 2 and 3, the air intake duct 104 comprises a first end 122 and a second end 124. The first end 122 is connected to an air intake manifold 126 via a first connector which may comprise a slip coupling 127. The second end 124 may be fixed to an air filter housing 130 via a flexible second connector 128. The first connector 127 and second connector 128 are configured to maintain a seal between the air intake manifold 104 and an air filter housing 130 during an impact derived displacement (such as rotation and translation) of the air intake duct 104, relative to the air filter housing 130. The slip coupling 127 is specifically configured to permit the rotational displacement of the air intake duct 104 relative to the air intake manifold 126, when a rotational force exceeding a predetermined value is applied to the air intake duct 104.

With reference to FIGS. 1A-3, the interaction of the crash deflector wedge 14 with an edge of the heater plenum chamber 6 in a frontal collision causes the spigot 12 to be rotated and translated away from the fuel pump 8.

When a frontal impact is received, along a line of action F, the air intake duct 4 is driven towards the heater plenum chamber 6. The direction of movement is substantially constant until the crash deflector wedge 14 meets and/or contacts a nearest edge of the heater plenum chamber 6. The crash deflector wedge 14 is configured and/or shaped to receive a reaction force from the heater plenum chamber 6 that is applied to the deflection surface 16. The crash deflector wedge 14 is configured to slide under the heater plenum chamber 6, and the impact derived force applied by the heater plenum chamber 6 to the air intake duct 4 acts to rotate the air intake duct 4. This is because the reaction force imposed on the air intake duct 4 produces a turning moment M on the air intake duct 4 which exceed the resistance of the slip coupling 127 and the resistance to twisting of the flexible coupling 128, enabling the air intake duct 4 to rotate clockwise as viewed in the drawings.

Additionally or alternatively, as shown in the FIGS. 1A-1C, the crash deflector wedge 14 comprises a triangular cross-section, wherein the deflection surface 16 of the crash deflector wedge 14 is the surface that contacts the nearest edge of the heater plenum chamber 6. As described above, the deflection surface 16 is arranged at the angle X relative to the horizontal plane H and the heater plenum chamber 6. A plane of the heater plenum chamber 6 may bisect the deflection surface 16, such that, in the event that the impact causes the air intake duct 4 to veer off of the line of action F by moving in a vertical direction, the nearest edge of the heater plenum chamber 6 is still likely to contact the deflection surface and provide the turning moment M. As such, a space may be created during the collision for the fuel pump 8 to move toward without colliding with the air intake duct.

The air intake duct 4 may also be deflected downwardly in a direction (e.g., along a vertical plane perpendicular to the horizontal plane H) that is non-parallel to the line of action F of the impact, and this may increase the clearance between the air intake duct 4 and the another engine bay component.

In alternative embodiments, there may be two or more third vehicle engine bay components 8, which may comprise fuel system components such as a fuel line, fuel pump, and/or fuel filler, and the impact derived force applied by the heater plenum chamber 6 to the air intake duct 4 causes rotation of the air intake duct 4, thereby increasing the clearance between the air intake duct 4 and the two or more third vehicle engine bay components 8.

During a collision, the restrictions provided by the fixings at the first and second ends 122, 124 of the air intake duct 104 impose forces on it that contribute to directing the displacement of the air intake duct 104 in addition to the guidance provided by the ramped surface 116. The configuration of such fixings enable the vehicle assembly 102 to guide the air intake duct 104 in a manner that minimizes a disturbance to the passage of filtered air through the air intake duct 104 to the engine.

In the arrangement of FIG. 4, the third vehicle engine bay component is a fuel pump 108, and rotation of the air intake duct 104 increases the clearance between the spigot 112 and the fuel pump 108.

With reference to FIG. 5, the third vehicle engine bay component may be a fuel line 108', and the air intake duct 104 may comprise a bent section 120. Rotation of the air intake duct 104 about a longitudinal axis lifts the bent section 120 of the air intake duct 104 out of the way of the fuel line 108', so that it is not damaged by impacting the bent section 120 during a collision.

In some arrangements, the deflection may move the first and/or second vehicle engine bay components 4,6 to a more desirable position to avoid damage to critical components such as fuel system components, but may not increase the clearance between the first vehicle engine bay component 4 and the second or third vehicle engine bay components 4,8.

The components 4, 6, 8 may comprise any vehicle engine bay components which may be brought closer together in an engine bay during a vehicle collision. For example, they may comprise a battery, a pipe, a tube, a hose, an engine accessory, an engine block, an engine head, a chassis member, a connector, a shaft, a housing, a heat exchanger, a radiator, a fan or a steering component.

In the illustrated arrangement, the main body 10 of the air intake duct 4 is cylindrical in cross-section, but in alternative arrangements the main body 10 may be of any shape, such as oval in cross-section. The main body 10 may be molded in one piece with the crash deflector wedge 14. For example, it may be blow molded.

In alternative arrangements, the main body 10 may be formed from metal, such as aluminum and the crash deflector wedge 14 may be formed with the main body 10. For example, at least one of the main body 10 and the crash deflector wedge 14 may be cast. The two components 10,14 may be cast together to form a single unitary component.

In other arrangements, the main body 10 and crash deflector wedge 14 may be formed separately and joined together. For example, the crash deflector wedge 14 may be attached to the main body 10 by releasable fasteners such as screws or bolts. In other arrangements, the crash deflector wedge 14 may be glued or welded or fastened or fused to the main body 10.

In this way, an engine component may comprise a deflector component shaped to allow the engine component to rotate during a vehicle collision as it collides with another engine component. The technical effect of rotating the engine component is to create more space in the engine bay for other engine components to mitigate degradation to the engine components while still packaging the engine components in a compact manner.

An embodiment of a system comprises a first vehicle engine bay component having a projection comprising a crash deflector with a deflection surface configured to engage a second vehicle engine bay component during a vehicle impact and cause controlled movement of at least a portion of the first vehicle engine bay component.

A first example of the system further comprises where the crash deflector comprises a wedge, the deflection surface comprising a surface of the wedge.

A second example of the system, optionally including the first example, further includes where the deflection surface is substantially planar and is aligned in use to cause a controlled movement in a direction non-parallel to a line of action of the impact.

A third example of the system, optionally including any of the previous examples, further includes where the controlled movement comprises a rotation of the first vehicle engine bay component relative to the second vehicle engine bay component.

A fourth example of the system, optionally including any of the previous examples, further includes where the controlled movement comprises a displacement of the first vehicle engine bay component relative to the second vehicle engine bay component.

A fifth example of the system, optionally including any of the previous examples, further includes where the impact is a frontal impact and the first vehicle engine bay component is moved at least partially around the second vehicle engine bay component by engagement of the crash deflector with the second vehicle engine bay component.

A sixth example of the system, optionally including any of the previous examples, further includes where the controlled movement of the first vehicle engine bay component increases the clearance to another components of a vehicle.

A seventh example of the system, optionally including any of the previous examples, further includes where the crash deflector is integrally formed with the first vehicle engine bay component.

An eighth example of the system, optionally including any of the previous examples, further includes where the crash deflector is blow molded with the first vehicle engine bay component.

A ninth example of the system, optionally including any of the previous examples, further includes where the first engine bay component is a section of fluid duct and the ends of the section of fluid duct are connected to the remainder of the duct by couplings which enable rotation of the first engine bay component relative to the remainder of the duct.

A tenth example of the system, optionally including any of the previous examples, further includes where the crash deflector is fixed to the first vehicle engine bay component.

An embodiment of a vehicle assembly comprises a first vehicle engine bay component and a second vehicle engine bay component, wherein the projecting wedge of the first vehicle engine bay component is configured to engage the second vehicle engine bay component during a vehicle impact, so that the first vehicle engine bay component is at least one of deflected and rotated in a direction non-parallel to a line of action of the impact and rotated.

A first example of the vehicle assembly further comprises a third vehicle engine bay component, wherein the crash deflector is arranged relative to the second vehicle engine bay component such that an impact at the crash deflector from the second vehicle engine bay component during a collision of the motor vehicle causes a controlled movement of at least a portion of the first vehicle engine bay component in a direction away from the third vehicle engine bay component.

A second example of the vehicle assembly, optionally includes the first example, further includes where the first vehicle engine bay component comprises an air intake duct, the second vehicle engine bay component comprises a heater plenum and the third vehicle engine bay component comprises a fuel system component.

In another representation, the first, second, and third components are arranged in a hybrid vehicle arrangement.

An embodiment of a system comprises a first engine bay component arranged between a second engine bay component and a third engine bay component, wherein the first engine bay component comprises a wedge protruding toward the second engine bay component shaped to rotate the first engine bay component when an angled deflection face of the wedge contacts the second engine bay component.

A first example of the system further includes where the third engine bay component is a fuel system component, and where the fuel system component is a fuel line, a fuel pump, or a fuel filler.

A second example of the system, optionally including the first example, further includes where the first engine bay component is an air intake duct.

A third example of the system, optionally including any of the previous examples, further includes where the second engine bay component is a heater plenum chamber.

A fourth example of the system, optionally including any of the previous examples, further includes where the wedge comprises a triangular cross-section.

A fifth example of the system, optionally including any of the previous examples, further includes where the angled deflection face is angled relative to a horizontal plane, and where the second engine bay component is parallel to the horizontal plane.

A fifth example of the system, optionally including any of the previous examples, further includes where an angle between the angled deflection face and the horizontal plane is 30 to 50 degrees.

A sixth example of the system, optionally including any of the previous examples, further includes where the angled deflection face contacts a nearest edge of the second engine bay component, wherein the angled deflection face is shaped to rotate the first engine bay component in response to the contact.

A seventh example of the system, optionally including any of the previous examples, further includes where the first engine bay component comprises a spigot, wherein the spigot is opposite the wedge, and where the wedge rotates downward and the spigot rotates upward in response to the contact, wherein the third engine bay component occupies a space formerly occupied by the spigot.

An embodiment of a vehicle engine bay, comprises an intake air duct comprising a spigot facing a fuel system component and a wedge facing a heater plenum chamber, wherein the spigot and the wedge are arranged on opposite sides of the intake air duct and where the wedge is shaped to rotate the intake air duct to move the spigot away from the fuel system component when the wedge contacts the heater plenum chamber.

A first example of the vehicle engine bay further includes where the wedge comprises a triangular cross-section, with a first side physically coupled to the intake air duct and perpendicular to a horizontal plane, a second side parallel to the horizontal plane, and a third side angled to each of the first side, the second side, and the horizontal plane.

A second example of the vehicle engine bay, optionally including the first example, further includes where the heater plenum chamber is parallel to the horizontal plane, and where the third side is positioned to contact the heater plenum chamber in response to a force applied along the horizontal plane.

A third example of the vehicle engine bay, optionally including any of the previous examples, further includes where the third side is shaped to rotate the intake air duct in response to the force, wherein the third side moves downward relative to the horizontal plane and the spigot moves upward relative to the horizontal plane.

A fourth example of the vehicle engine bay, optionally including any of the previous examples, further includes where the fuel system component occupies a space formerly occupied by the spigot prior to the force.

A fifth example of the vehicle engine bay, optionally including any of the previous examples, further includes where the intake air duct and the wedge are a single, aluminum piece. A sixth example of the vehicle engine bay, optionally including any of the previous examples, further includes where the intake air duct and the wedge are molded separately, and where the wedge is physically coupled to the intake air duct via one or more of a weld, a fusion, an adhesive, and a fastener.

An embodiment of a vehicle system, comprises a fuel system component, an intake air duct, and a heater plenum chamber arranged in-line along a horizontal plane, the intake air duct comprising a spigot and a wedge arranged opposite one another along the horizontal plane, wherein the intake air duct is arranged between the fuel system component and the heater plenum with the spigot adjacent to the fuel system component and the wedge adjacent to the heater plenum, wherein the wedge comprises an angled deflection surface angled relative to the horizontal plane and shaped to rotate the intake air duct in response to a force along the horizontal plane displacing the intake air duct toward the heater plenum chamber.

A first example of the vehicle system further includes where the force corresponds to a vehicle collision.

A second example of the vehicle system, optionally including the first example, further includes where the vehicle collision is a front-end collision.

A third example of the vehicle system optionally including any of the previous examples, further includes where the intake air duct and the wedge are a single, molded aluminum piece. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a first engine bay component arranged between a second engine bay component and a third engine bay component, wherein the first engine bay component comprises a spigot and a wedge, the wedge protruding toward the second engine bay component shaped to rotate the first engine bay component when an angled deflection face of the wedge contacts the second engine bay component, the spigot opposite the wedge and rotates upward while the wedge rotates downward in response to the contact.

2. The system of claim 1, wherein the third engine bay component is a fuel system component, and where the fuel system component is a fuel line, a fuel pump, or a fuel filler.

3. The system of claim 1, wherein the first engine bay component is an air intake duct.

4. The system of claim 1, wherein the second engine bay component is a heater plenum chamber.

5. The system of claim 1, wherein the wedge comprises a triangular cross-section.

6. The system of claim 1, wherein the angled deflection face is angled relative to a horizontal plane, and where the second engine bay component is parallel to the horizontal plane.

7. The system of claim 6, wherein an angle between the angled deflection face and the horizontal plane is 30 to 50 degrees.

8. The system of claim 6, wherein the angled deflection face contacts a nearest edge of the second engine bay component, wherein the angled deflection face is shaped to rotate the first engine bay component in response to the contact.

9. The system of claim 8, wherein the third engine bay component occupies a space formerly occupied by the spigot.

10. A vehicle engine bay, comprising:
an intake air duct comprising a spigot facing a fuel system component and a wedge facing a heater plenum chamber, wherein the spigot and the wedge are arranged on opposite sides of the intake air duct and where the wedge is shaped to rotate the intake air duct to move the spigot away from the fuel system component when the wedge contacts the heater plenum chamber.

11. The vehicle engine bay of claim 10, wherein the wedge comprises a triangular cross-section, with a first side physically coupled to the intake air duct and perpendicular to a horizontal plane, a second side parallel to the horizontal plane, and a third side angled to each of the first side, the second side, and the horizontal plane.

12. The vehicle engine bay of claim 11, wherein the heater plenum chamber is parallel to the horizontal plane, and where the third side is positioned to contact the heater plenum chamber in response to a force applied along the horizontal plane.

13. The vehicle engine bay of claim 12, wherein the third side is shaped to rotate the intake air duct in response to the force, wherein the third side moves downward relative to the horizontal plane and the spigot moves upward relative to the horizontal plane.

14. The vehicle engine bay of claim 13, wherein the fuel system component occupies a space formerly occupied by the spigot prior to the force.

15. The vehicle engine bay of claim 10, wherein the intake air duct and the wedge are a single, aluminum piece.

16. The vehicle engine bay of claim 10, wherein the intake air duct and the wedge are molded separately, and where the wedge is physically coupled to the intake air duct via one or more of a weld, a fusion, an adhesive, and a fastener.

17. A vehicle system, comprising:
a fuel system component, an intake air duct, and a heater plenum chamber arranged in-line along a horizontal plane, the intake air duct comprising a spigot and a wedge arranged opposite one another along the horizontal plane, wherein the intake air duct is arranged between the fuel system component and the heater plenum with the spigot adjacent to the fuel system component and the wedge adjacent to the heater plenum, wherein the wedge comprises an angled deflection surface angled relative to the horizontal plane and shaped to rotate the intake air duct in response to a force along the horizontal plane displacing the intake air duct toward the heater plenum chamber.

18. The vehicle system of claim 17, wherein the force corresponds to a vehicle collision.

19. The vehicle system of claim 18, wherein the vehicle collision is a front-end collision.

20. The vehicle system of claim 17, wherein the intake air duct and the wedge are a single, molded aluminum piece.

* * * * *